United States Patent
Sugawara et al.

(10) Patent No.: US 11,516,408 B2
(45) Date of Patent: Nov. 29, 2022

(54) IMAGE CAPTURING APPARATUS, METHOD FOR DRIVING IMAGE CAPTURING APPARATUS TO DETECT FLICKER DURING SHOOTING

(71) Applicant: CANON KABUSHIKI KAISHA, Tokyo (JP)

(72) Inventors: Atsushi Sugawara, Kanagawa (JP); Hinako Nakamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/326,135

(22) Filed: May 20, 2021

(65) Prior Publication Data

US 2021/0377436 A1 Dec. 2, 2021

(30) Foreign Application Priority Data

May 29, 2020 (JP) .............................. JP2020-094908
Feb. 18, 2021 (JP) .............................. JP2021-024400

(51) Int. Cl.
*H04N 5/235* (2006.01)

(52) U.S. Cl.
CPC ......... *H04N 5/2357* (2013.01); *H04N 5/2351* (2013.01)

(58) Field of Classification Search
CPC .. H04N 5/2357; H04N 5/2351; H04N 5/2353; H04N 5/2356; H04N 5/2254
See application file for complete search history.

(56) References Cited

U.S. PATENT DOCUMENTS

| 2010/0013953 A1* | 1/2010 | Niikura | H04N 5/2353 348/226.1 |
| 2012/0057046 A1* | 3/2012 | Tanaka | H04N 5/2357 348/229.1 |
| 2015/0002694 A1* | 1/2015 | Hasegawa | H04N 5/2357 348/226.1 |
| 2016/0028933 A1* | 1/2016 | Kajiyama | H04N 5/2357 348/226.1 |
| 2016/0373632 A1 | 12/2016 | Sugawara | |
| 2019/0253604 A1* | 8/2019 | Noda | H04N 5/357 |

FOREIGN PATENT DOCUMENTS

| JP | 2017-011352 A | 1/2017 |
| WO | 2008/108025 A1 | 9/2008 |

\* cited by examiner

*Primary Examiner* — Luong T Nguyen
(74) *Attorney, Agent, or Firm* — Canon U.S.A., Inc. IP Division

(57) ABSTRACT

An image capturing apparatus comprises an image sensor, a drive control unit for the image sensor, and a detection unit configured to calculate an evaluation value based on second images and detect flicker based on the evaluation value. The drive control unit controls to perform, during a live view cycle of a display device, a first operation for reading out a first image to be displayed, and a second operation for reading out the second images at a second cycle which is shorter than the time taken to read out the first image at timings different from a timing of reading out the first image. Upon calculating the evaluation value based on the second images, the detection unit detects flicker by using different pairs of images from among the second images for calculation of the evaluation value according to the first cycle.

22 Claims, 15 Drawing Sheets

| CYCLE OF SET OPERATION [ms] | FRAME RATE OF LIVE VIEW DISPLAY [fps] | NUMBER OF FLICKER DETECTION IMAGES THAT CAN BE CAPTURED IN EACH SET OPERATION |
|---|---|---|
| 33.33 | 30 | 18 |
| 16.67 | 60 | 8 |
| 8.33 | 120 | 3 |

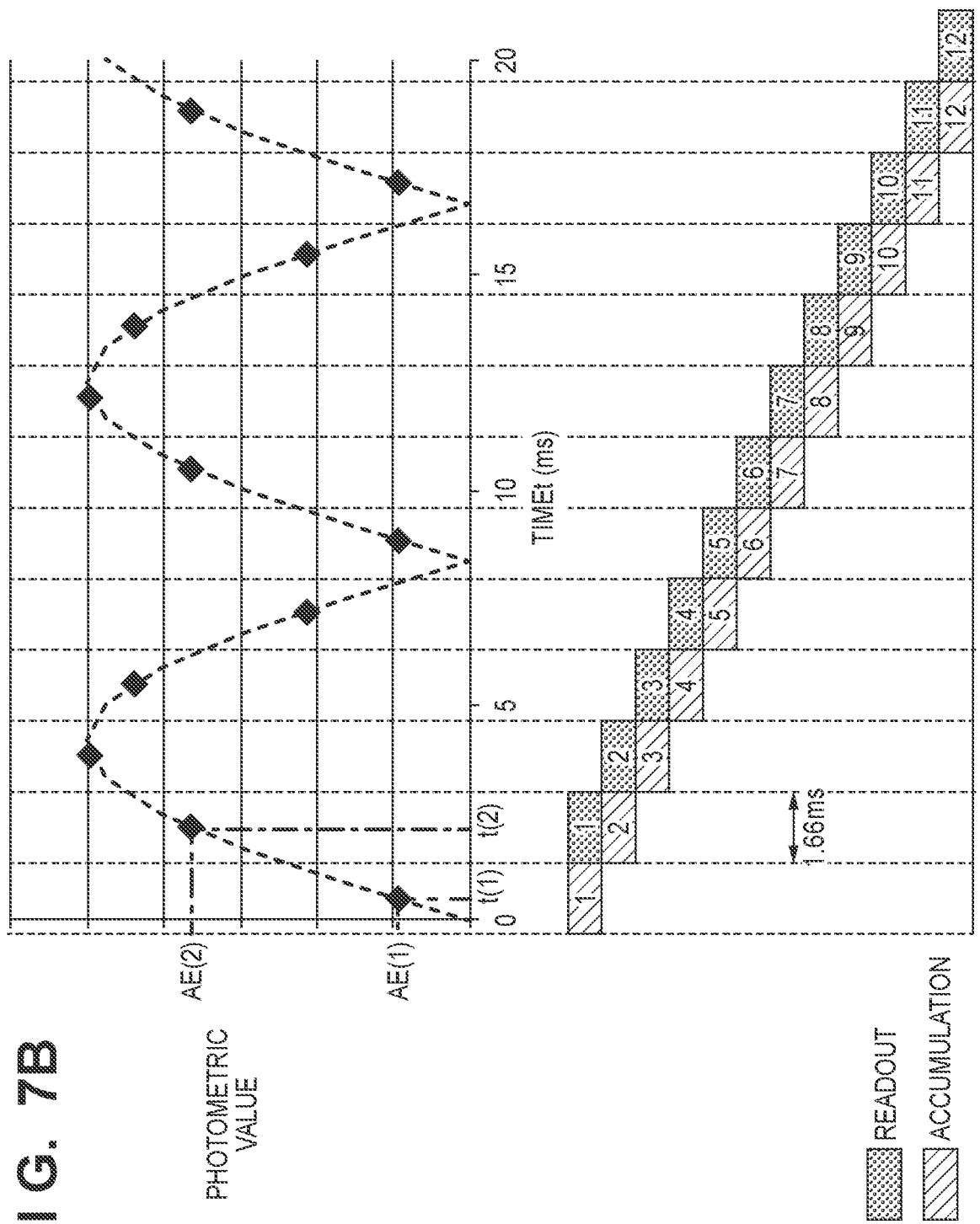

FIG. 8A
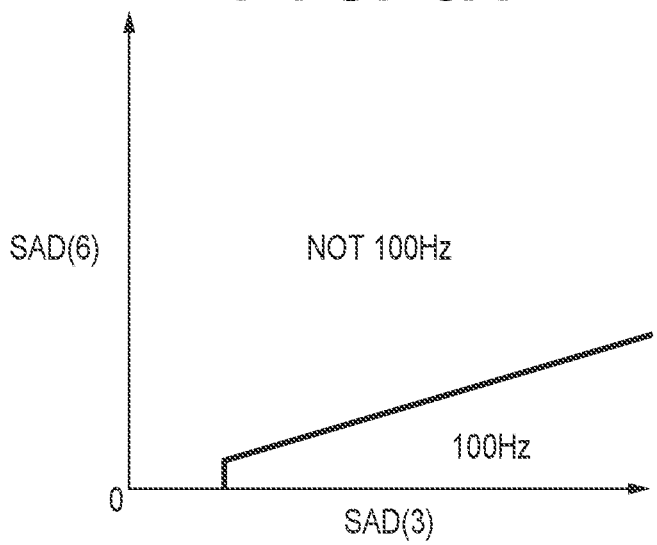
FIG. 8B
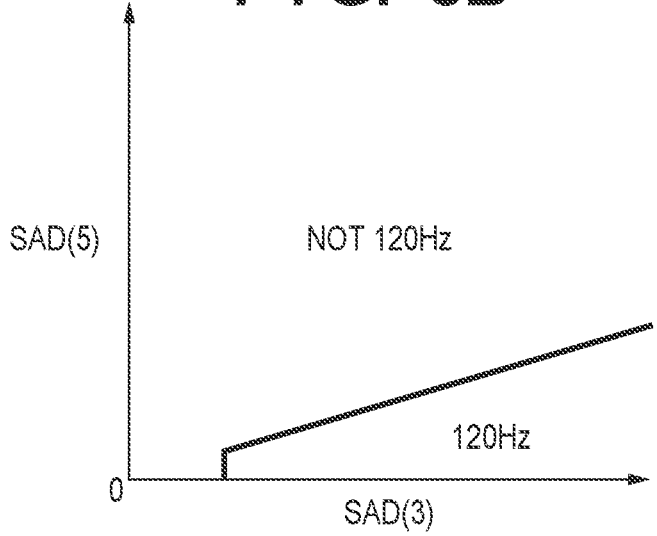
FIG. 9
|  |  | DETERMINATION RESULT USING FIG. 8A ||
|---|---|---|---|
|  |  | 100Hz | NOT 100Hz |
| DETERMINATION RESULT USING FIG. 8B | 120Hz | NO FLICKER | 120Hz |
|  | NOT 120Hz | 100Hz | NO FLICKER |

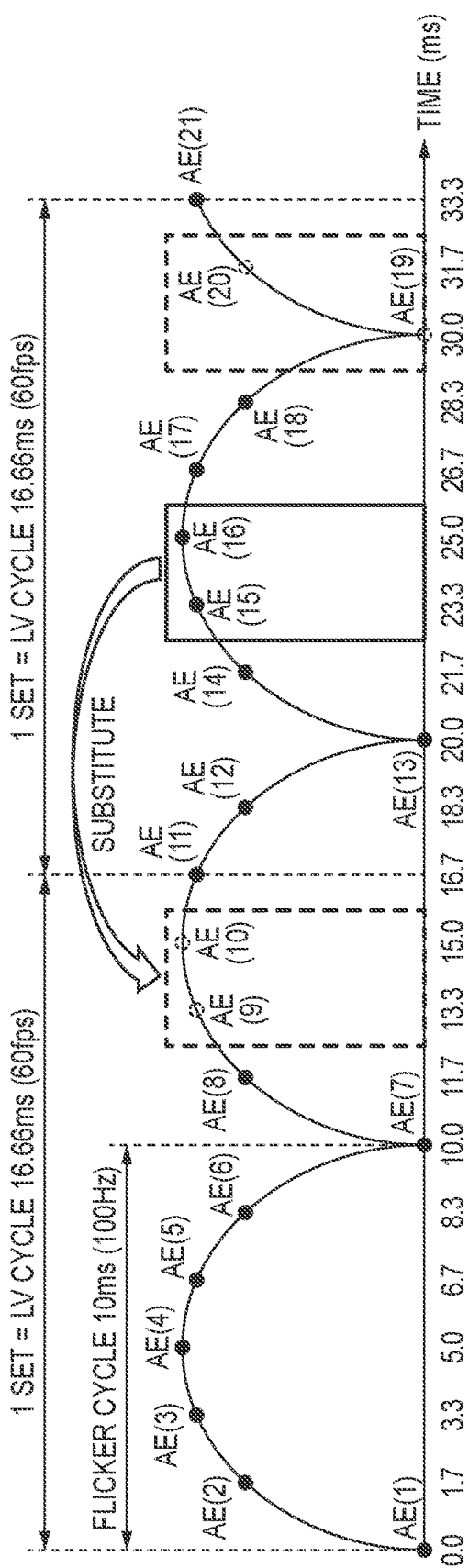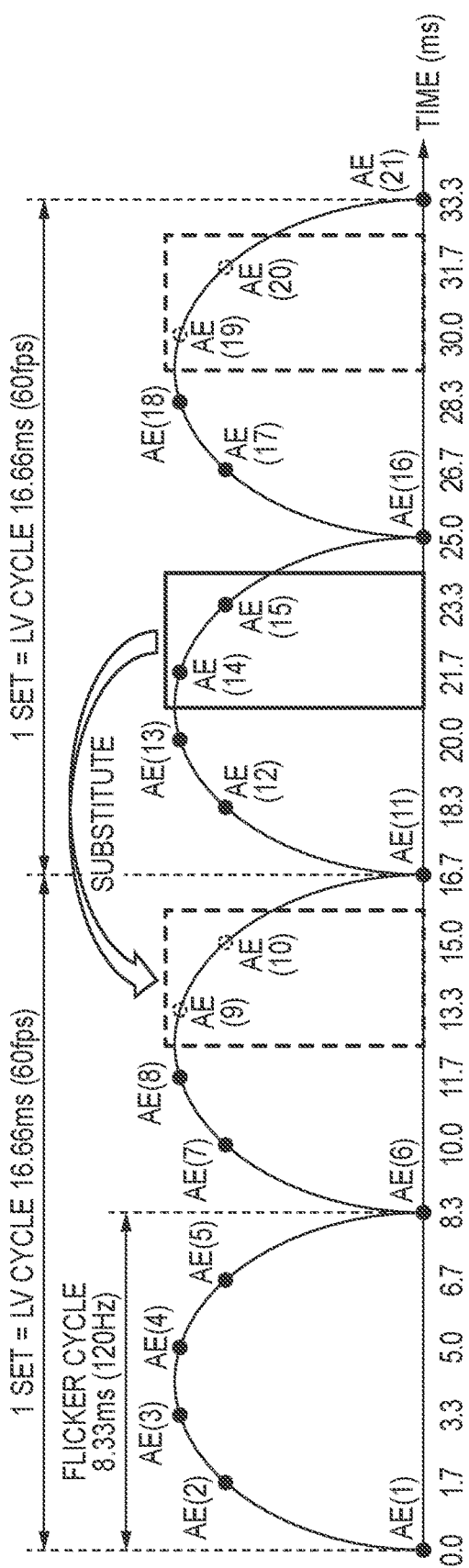

F I G. 16A
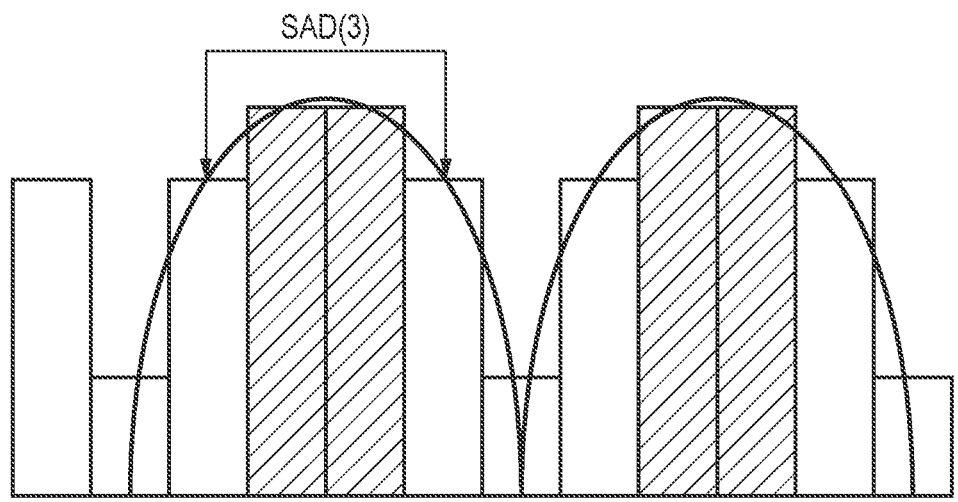
F I G. 16B
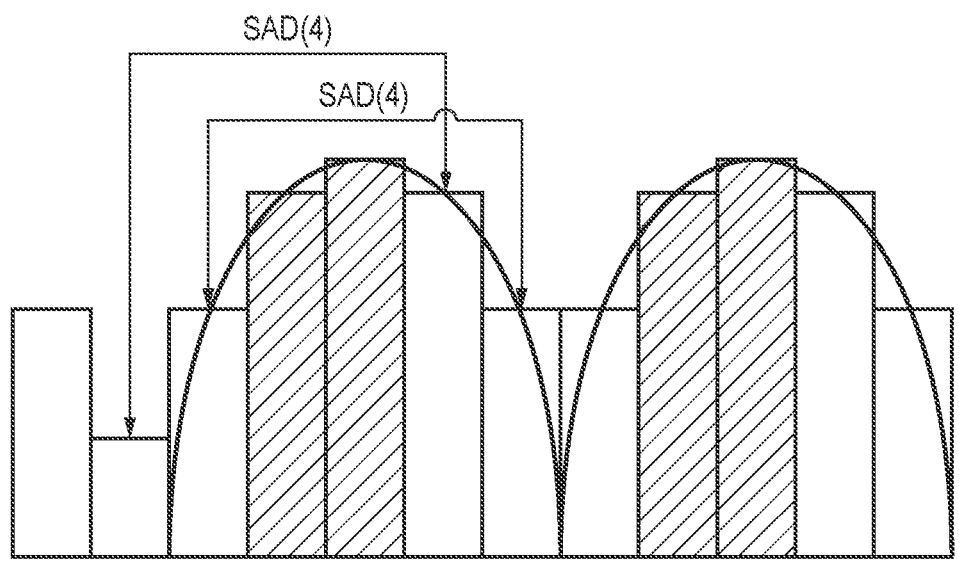

IMAGE CAPTURING APPARATUS, METHOD FOR DRIVING IMAGE CAPTURING APPARATUS TO DETECT FLICKER DURING SHOOTING

BACKGROUND OF THE INVENTION

Field of the Invention

The present invention relates to an image capturing apparatus, a method for driving the image capturing apparatus and a storage medium, and more specifically to detecting a change in external light (flicker) that occurs during shooting.

Description of the Related Art

With the recent increase in ISO of digital cameras, high-speed shutters can be released even under an artificial light source that generates flicker. While there is an advantage that pictures without blurring can be taken when shooting indoor sports, etc., in shooting with high-speed shutter under a flicker light source, due to the influence of flicker, exposure and color unevenness may occur between frames of images or even within an image of one frame.

To solve such a problem, there is a method of reducing the influence of flicker by detecting flicker and performing exposure at the peak position of flicker, where the change in brightness is smallest. In particular, regarding the detection of flicker and its frequency, the following method is disclosed in Japanese Patent Laid-Open No. 2017-11352. First, photometry is performed a plurality of times in a fixed cycle, and among the obtained multiple photometric values, a first evaluation value is obtained from the photometric values acquired at a first interval whose phase is close to the phase of the flicker, and a second evaluation value is obtained from the photometric values acquired at a second interval whose phase is close to the opposite phase of the flicker. Then, the presence or absence of flicker and the frequency of the flicker are determined from the obtained first evaluation value and the second evaluation value.

However, in the prior art disclosed in Japanese Patent Laid-Open No. 2017-11352, it is necessary to acquire images for flicker detection at a high frame rate, so that the images for flicker detection are actually obtained by performing processing such as thinning and addition of pixels. Therefore, there is a problem from the viewpoint of image quality to use the images for flicker detection as images viewed by the user as in a live view display. In particular, in a camera having only one image sensor, such as a mirrorless camera, images for live view display and images for flicker detection are acquired using the same image sensor. Therefore, when flicker detection is performed in such a camera, the live view display will be temporarily blacked out or frozen.

SUMMARY OF THE INVENTION

The present invention has been made in consideration of the above situation, and flicker can always be detected even during displaying a live view without blackout or freezing of the live view display.

According to the present invention, provided is an image capturing apparatus comprising: an image sensor; a drive control unit that drives the image sensor; and a detection unit that calculates an evaluation value based on a plurality of second images and detects flicker based on the evaluation value, wherein the drive control unit controls to perform, during a first cycle of a display device: a first operation for reading out a first image to be displayed on the display device; and a second operation for reading out the plurality of second images at a second cycle which is shorter than the time taken to read out the first image at timings different from a timing of reading out the first image in a predetermined period in which the first image is read out from the image sensor, and wherein, upon calculating the evaluation value based on the plurality of second images, the detection unit detects flicker by using different pairs of images from among the plurality of second images for calculation of the evaluation value according to the first cycle, wherein each unit is implemented by one or more processors, circuitry or a combination thereof.

Further, according to the present invention, provided is a control method of an image capturing apparatus having an image sensor, the method comprising: a drive control step of driving the image sensor; and a detection step of calculating an evaluation value based on a plurality of second images and detecting flicker based on the evaluation value, wherein, in the drive control step, it is controlled so as to perform, during a first cycle of a display device: a first operation for reading out a first image to be displayed on the display device; and a second operation for reading out the plurality of second images at a second cycle which is shorter than the time taken to read out the first image at timings different from a timing of reading out the first image in a predetermined period in which the first image is read out from the image sensor, and wherein, in the detection step, upon calculating the evaluation value based on the plurality of second images, flicker is detected by using different pairs of images from among the plurality of second images for calculation of the evaluation value according to the first cycle.

Furthermore, according to the present invention, provided is a non-transitory computer-readable storage medium storing a program that when executed by a computer causes the computer to perform the method of an image capturing apparatus having an image sensor, the method comprising: a drive control step of driving the image sensor; and a detection step of calculating an evaluation value based on a plurality of second images and detecting flicker based on the evaluation value, wherein, in the drive control step, it is controlled so as to perform, during a first cycle of a display device: a first operation for reading out a first image to be displayed on the display device; and a second operation for reading out the plurality of second images at a second cycle which is shorter than the time taken to read out the first image at timings different from a timing of reading out the first image in a predetermined period in which the first image is read out from the image sensor, and wherein, in the detection step, upon calculating the evaluation value based on the plurality of second images, flicker is detected by using different pairs of images from among the plurality of second images for calculation of the evaluation value according to the first cycle.

Furthermore, according to the present invention, provided is a non-transitory computer-readable storage medium storing a program that when executed by a computer causes the computer to perform the above control method.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodi

FIGS. 7A and 7B are diagrams showing relationship between acquisition timings of images for flicker detection and outputs of photometric values when the frame rate of the live view display is 30 fps according to the first embodiment.

FIGS. 8A and 8B are diagrams used for determining presence or absence of flicker according to the first embodiment.

FIG. 9 is a table used for integrating flicker determination results according to the first embodiment.

FIGS. 11A and 11B are diagrams showing the relationship between acquisition timings of images for flicker detection and the outputs of photometric values when the frame rate of the live view display is 60 fps according to the first embodiment.

FIGS. 16A and 16B are diagrams showing relationship between acquisition timings of flicker detection images and evaluation values according to the second embodiment.

DESCRIPTION OF THE EMBODIMENTS

Figure 1:
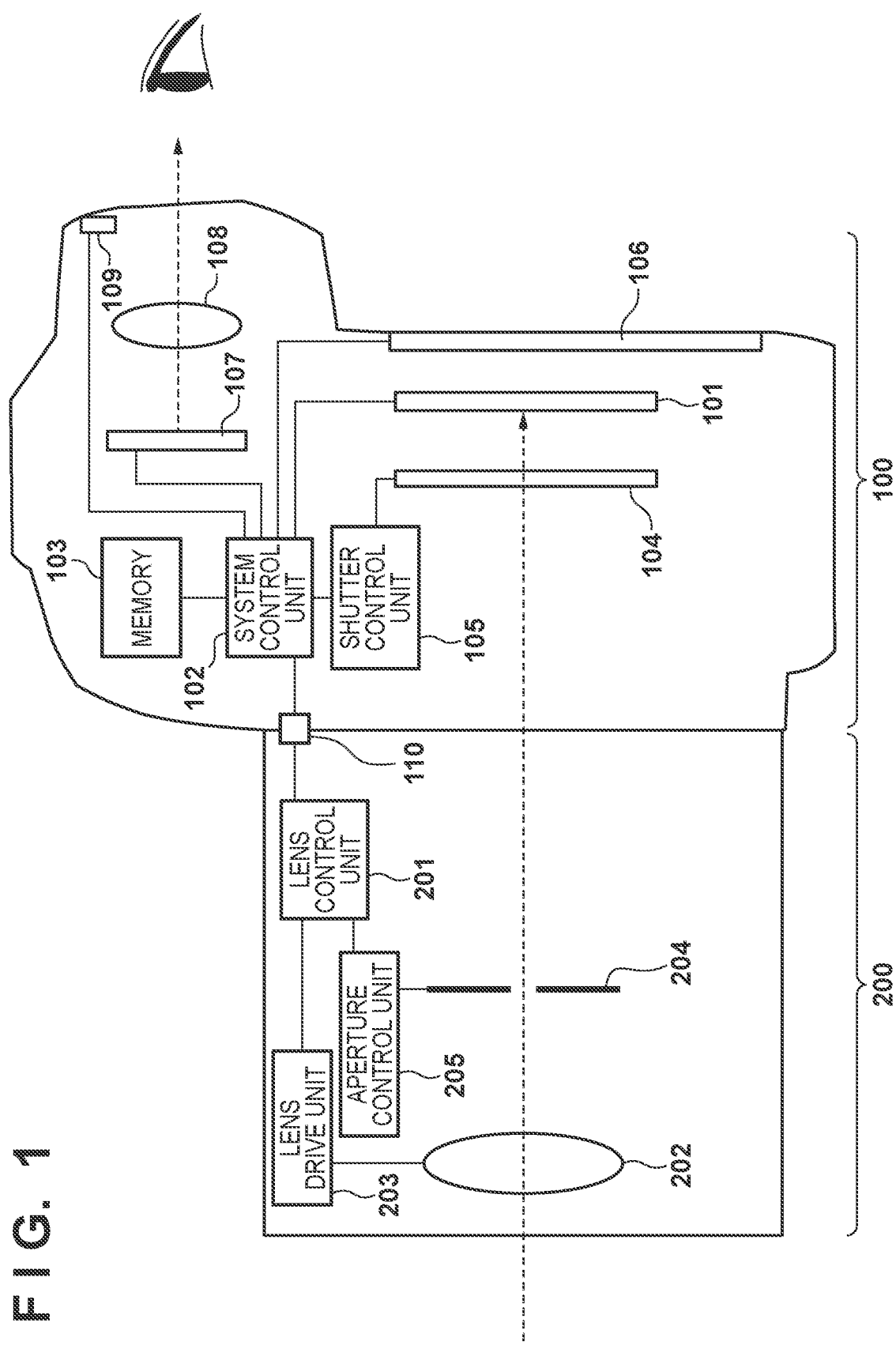
- FIG. 1 is a diagram showing a schematic configuration of an image capturing apparatus according to a first embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Each of the embodiments of the present invention described below can be implemented solely or as a combination of a plurality of the embodiments or features thereof where necessary or where the combination of elements or features from individual embodiments in a single embodiment is beneficial. Furthermore, the same reference numerals are given to the same or similar configurations, and redundant description thereof is omitted.

First Embodiment

In this embodiment, a digital camera will be described as an example of an image capturing apparatus. However, the present invention is not limited to this, and various electronic devices having a camera function may be used. For example, the image capturing apparatus according to the present invention may be a mobile communication terminal with a camera function such as a mobile phone or a smartphone, a portable computer with a camera function, a portable game machine with a camera function, or the like.

FIG. 1 is a diagram showing a schematic configuration of a digital camera according to the present embodiment. The digital camera shown in FIG. 1 is mainly composed of a camera body 100 and an imaging lens 200, which are mechanically and electrically connected via a lens mount mechanism 110. Although the imaging lens 200 is described here as being removable from the camera body 100, it may be integrally configured with the camera body 100.

An image sensor 101 mounted in the camera main body 100 is an image sensor composed of a photoelectric conversion element such as a CCD or CMOS sensor, including an infrared cut filter, a low-pass filter, and the like. A shutter 104 closes to shield the image sensor 101 from light when shooting is not performed, and opens during live view display or when shooting is performed so as to allow the light that has passed through the imaging lens 200 to be incident on the image sensor 101.

A system control unit 102 is an arithmetic processing unit that controls each unit of the camera main body 100. A memory 103 includes a ROM for storing programs executed by the system control unit 102 and variables, and a RAM having a work area for developing the program by the system control unit 102 and a temporary storage area for image data and the like.

Further, the system control unit 102 is connected to a lens control unit 201 in the imaging lens 200 through the lens mount mechanism 110. The system control unit 102 performs processing related to exposure control (AE) and focus adjustment (AF) using an image acquired by the image sensor 101, determines the position of a focus lens 202 and an aperture value according to the processing result, and sends them to the lens control unit 201. The lens control unit 201 controls the position of the focus lens 202 through a lens drive unit 203 and controls a diaphragm 204 through an aperture control unit 205 based on the position of the focus lens 202 and the aperture value sent from the system control unit 102.

Further, the shutter 104 is also connected to the system control unit 102 through a shutter control unit 105, and is controlled to expose the image sensor 101 for an exposure period according to the processing result of the system control unit 102.

In the present embodiment, two types of displays, a rear monitor 106 and a finder display unit 107, are provided for displaying images captured by the image sensor 101, and an image is displayed on either of these displays by switching between them. The switching between the displays is performed according to the detection result of an eye detection unit 109, and when it is detected that an eye exists near a finder, an image is displayed on the finder display unit 107. As a result, the user can confirm a subject by looking into the finder to see the finder display unit 107 through an eyepiece lens 108. On the other hand, when the eye detection unit 109 determines that no eye exists near the finder, the image is displayed on the rear monitor 106.

The rear monitor 106 also has a function as a touch panel, and constitutes an operation unit that receives instructions from the user together with buttons and dials (not shown). The system control unit 102 receives a user's instruction from the operation unit and performs control according to the input instruction.

Next, displaying of images captured by the image sensor 101 will be described. Here, an operation in a so-called live view mode in which the user observes a subject by continuously capturing images with the image sensor 101 and displaying the captured images on the display unit in real time will be described.

Figures 2, 3:
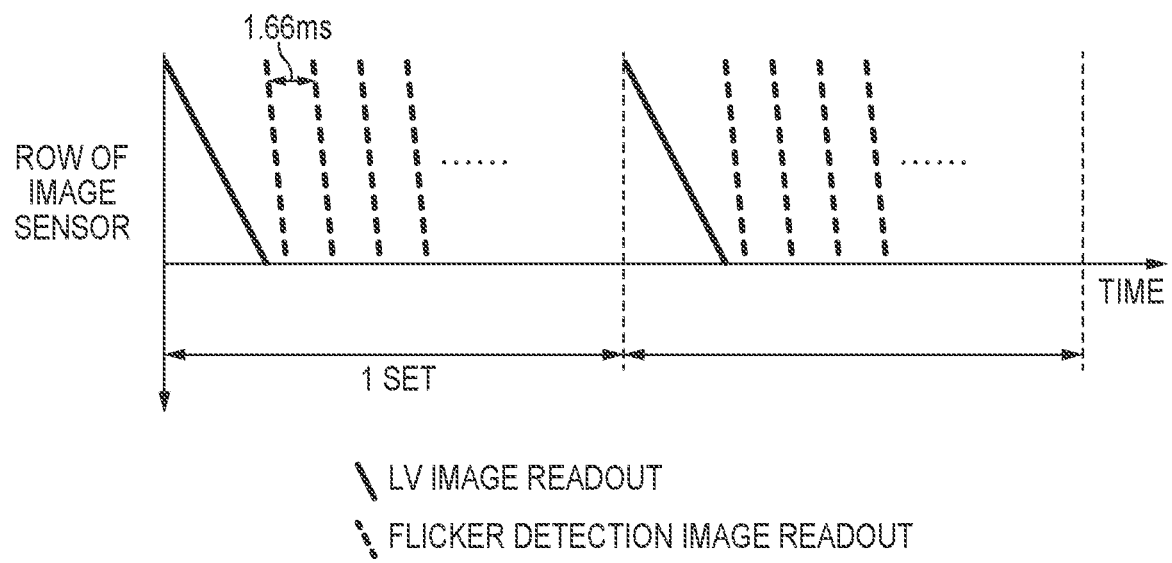
FIG. 2 is a diagram illustrating driving of an image sensor in a live view mode according to the first embodiment.
FIG. 3 is a diagram showing relationship between a frame rate of live view display and the number of images for flicker detection that can be acquired according to the first embodiment.

FIG. 2 is a diagram for explaining the driving of the image sensor 101 in the live view mode. The horizontal axis shows time and the vertical axis shows the vertical position (row) of the image sensor 101. Solid diagonal lines indicate readout timings of images for live view display (hereinafter referred to as "LV images") from the image sensor 101, and broken diagonal lines indicate readout timings of images for flicker detection (hereinafter referred to as "flicker detection images"). As shown in FIG. 2, first, one LV image is read out, and then a plurality of flicker detection images are read out. The acquisition of one LV image and a plurality of flicker detection images is regarded as one set, and the readout operation of the set (hereinafter, referred to as "set operation") is repeated. A period for the set operation corresponds to the interval (1 frame) between vertical synchronization signals consecutively output at the time of driving the image sensor 101.

In this embodiment, flicker detection images are captured at 1.66 ms intervals. Generally, the frequency of the flicker light source is either 100 Hz or 120 Hz, which is twice the frequency of the commercial power supply, 50 Hz or 60 Hz. Therefore, by continuously acquiring images at a shooting cycle of 600 fps, which is the least common multiple of 100 Hz and 120 Hz, and comparing the brightness of the images, it is possible to detect both of the changing amounts of light due to flickers corresponding to the frequencies of the commercial power supply of both 50 Hz and 60 Hz. By continuously capturing flicker detection images of a subject at 600 fps (1.66 ms intervals) so as to conform to the cycle of the changing amount of light due to flicker as in the present embodiment and determining the time-series change in brightness, it is possible to detect the presence or absence of flicker and the peak intensity of light from the light source for both 100 Hz and 120 Hz as will be described later.

When the frame rate of the live view display is 1/T [fps], the set operation is repeated in a cycle of T [ms]. Assuming that the time required to read out one LV image and the time required to read out one flicker detection image are constant, how many flicker detection images can be acquired in each set operation depends on the cycle T [ms] of the set operation. Therefore, the longer the cycle T [ms] of the set operation is, the larger the number of flicker detection images that can be acquired in the remaining time after reading out the LV image becomes.

A table in FIG. 3 shows an example of the relationship between the cycle of the set operation, the frame rate of the live view display, and the number of flicker detection images that can be captured in each set operation in the present embodiment. If the frame rate of the live view display is increased, the power consumption generally increases, so the frame rate is set in consideration of the power consumption and the smoothness of a displayed image. In the present embodiment, as an example, the user sets the frame rate from the three choices of 30/60/120 fps shown in the table of FIG. 3 via the operation unit, and the set frame rate is used.

When the frame rate is determined, the cycle of the set operation is determined, and the number of flicker detection images that can be captured in each set operation is also determined. The system control unit 102 performs drive control of the image sensor 101 so as to read out one LV image and the number of flicker detection images shown in FIG. 3 based on the set frame rate.

Next, the shooting processing in the live view mode in the present embodiment will be described with reference to the flowchart of FIG. 4.

The shooting processing of the present embodiment is started when the start operation of the live view display is accepted. First, in step S101, the set frame rate of the live view display is read. As described above, the frame rate is set in advance by the user from three choices of 30/60/120 fps in consideration of power consumption and smoothness of a displayed image.

After the frame rate is read, in step S102, the set operation shown in FIG. 2 is performed at the read frame rate, and accumulation and readout of the LV image and the flicker detection images are performed. Then, in step S103, the LV image acquired by the set operation is displayed on the rear monitor 106 or the finder display unit 107 according to the detection result of the eye detection unit 109.

Next, in step S104, the set frame rate is determined, and if it is 30 fps, the process proceeds to step S105, a flicker detection process when the frame rate of the live view display is 30 fps is performed, and the process proceeds to step S107. If the set frame rate is 60 fps, the process proceeds to step S106, a flicker detection process when the frame rate of the live view display is 60 fps is performed, and the process proceeds to step S107. On the other hand, if the set frame rate is 120 fps, no flicker detection process is performed, the flicker is not detected, and the process directly proceeds to step S107. The processes in steps S104 and S105 will be described later with reference to FIGS. 5 and 6, respectively. The reason why the flicker detection process is not performed when the set frame rate is 120 fps will also be described later.

In step S107, it is determined whether or not a shooting instruction is received from the user. If the shooting instruction is not received, the processes of steps S102 to S107 are repeated, and when the shooting instruction is received, the process proceeds to step S108.

In step S108, it is determined whether or not flicker is detected. If flicker is not detected in the process of step S105 or S106, or if the frame rate of the live view display is determined to be 120 fps in step S104 and flicker is not detected since flicker detection is not performed, the process proceeds to step S109. In step S109, normal shooting in which the traveling timing of the shutter 104 is not controlled is performed. On the other hand, when flicker is detected in the process of step S105 or S106, the process proceeds to step S110 and the shutter 104 is controlled to travel at the timing synchronized with the peak of the flicker to shoot an image. After shooting in step S109 or S110, the process ends.

Figure 5:
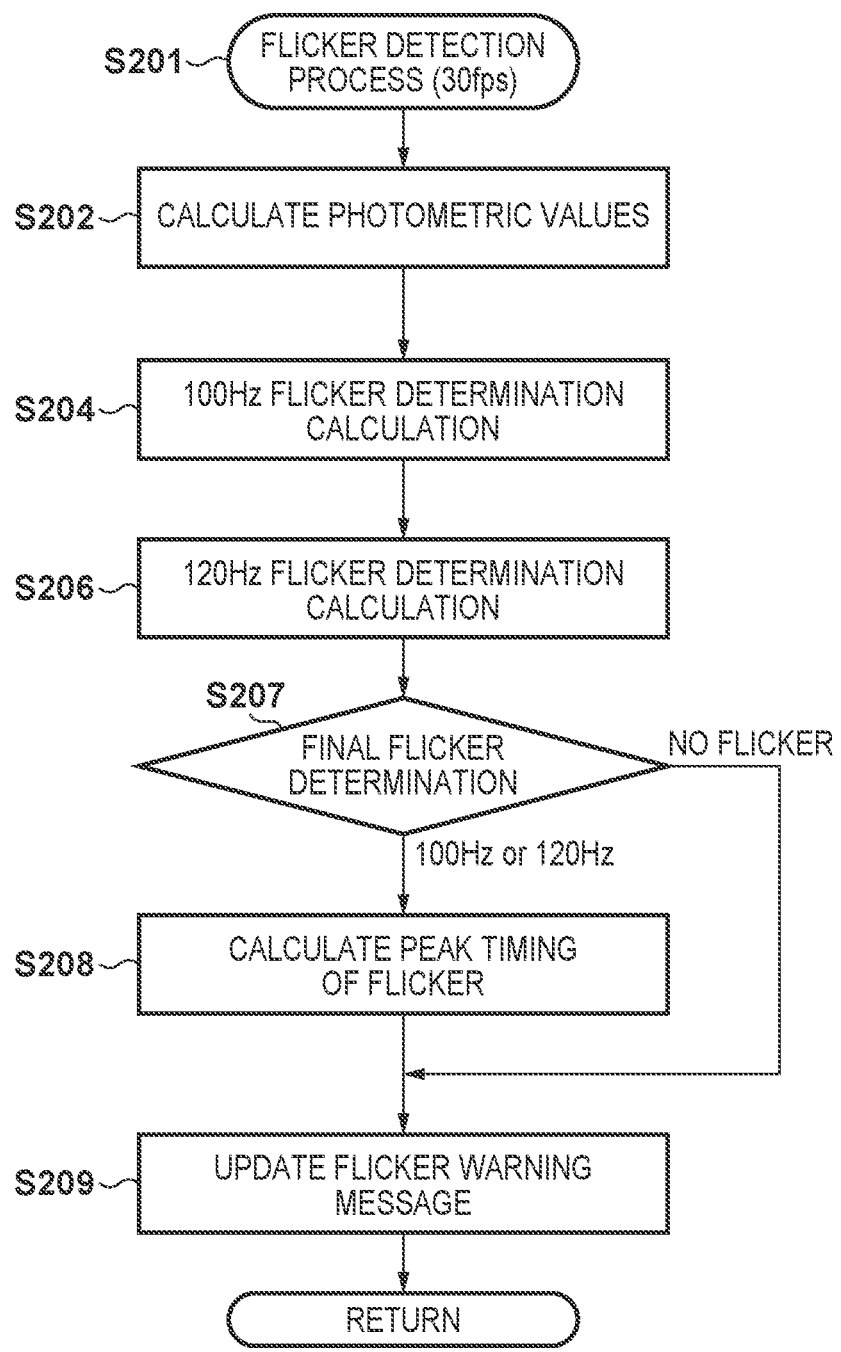
FIG. 5 is a flowchart of a flicker detection process when the frame rate of the live view display is 30 fps according to the first embodiment.

Next, the flicker detection process performed in step S104 when the frame rate of the live view display is set to 30 fps will be described with reference to the flowchart of FIG. 5.

In the present embodiment, as shown in FIG. 3, when the frame rate of the live view display is 30 fps, the number of flicker detection images that can be acquired by each set operation is 18, and these 18 images are captured in a cycle of 1.66 ms, namely, at 600 fps. Here, FIG. 7A shows the transition of the accumulation control and the photometric value under the environment of 100 Hz flicker (flicker generated with the commercial power supply of 50 Hz).

The basic idea of flicker determination is to acquire the photometric value data of the flicker detection image obtained during the time of two cycles of the flicker to be detected, and to calculate the correlation between data of the first cycle and data of the second cycle. Therefore, at the time of 100 Hz flicker determination, the calculation is performed using the data for 20 ms, which corresponds to two cycles, and at the time of 120 Hz flicker determination, the calculation is performed using the data for 16.6 ms, which corresponds to two cycles. In order to be able to detect flicker of either frequency, longer data for 20 ms (more than twice the period of the flicker to be detected) is used. Since the flicker detection images are acquired at a cycle of 1.66 ms, if 12 consecutive images are used, the amount becomes 20 ms, and the flicker can be determined.

That is, when the frame rate of the live view display is 30 fps, the remaining time after reading out the LV image is more than twice the cycle of the flicker of 100 Hz, and 18 flicker detection images can be acquired in each set operation. Of the 18 flicker detection images, only the first 12 images are used, and the photometric values of these 12 flicker detection images are shown in FIG. 7A.

Figure 7A:
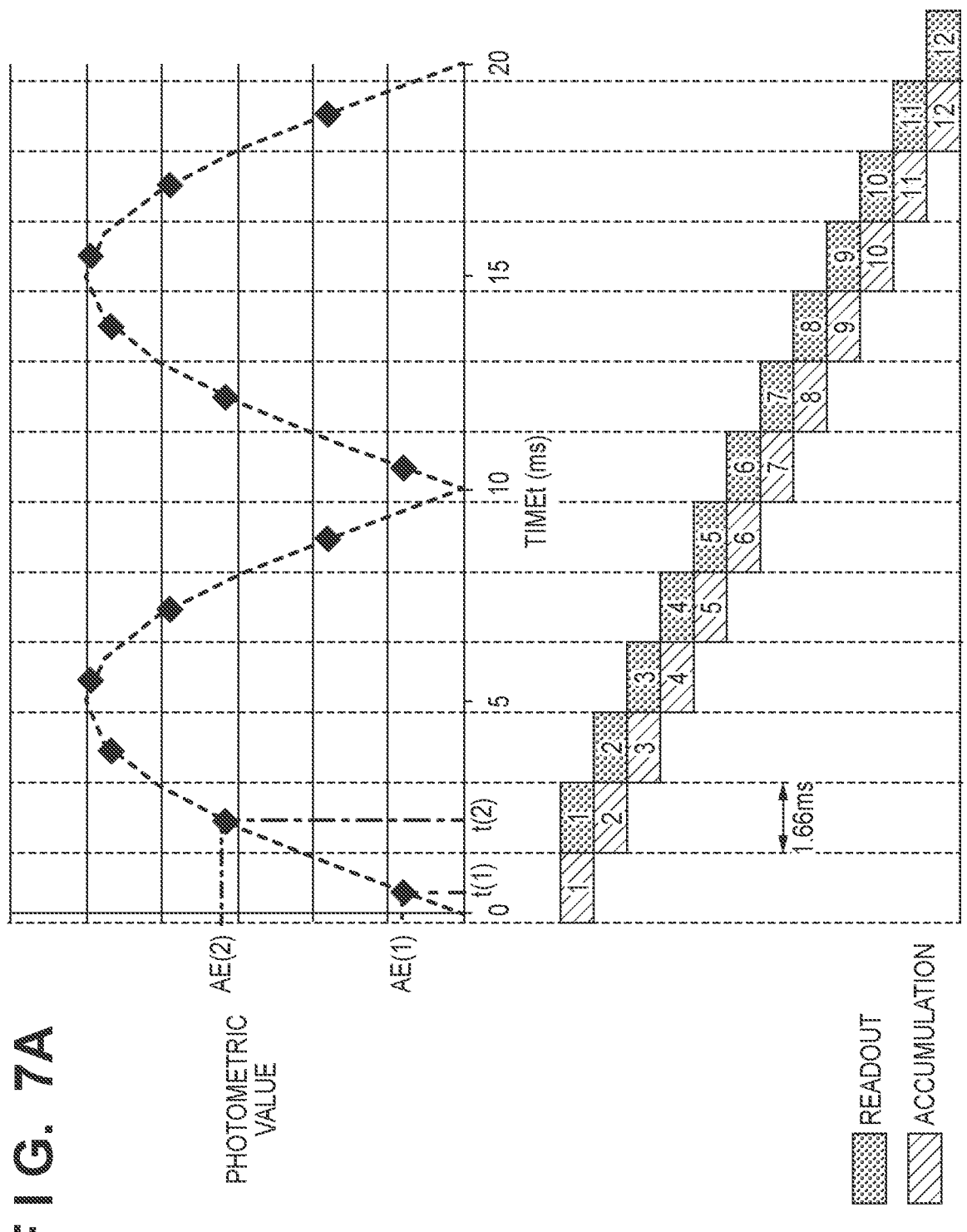

In FIG. 7A, the $n^{th}$ accumulation is described as "accumulation n", the reading corresponding to the accumulation n is described as "readout n", and the photometric value obtained from the result of the readout n (the $n^{th}$ flicker detection image) is described as "AE(n)" (n is a natural number). Since the first 12 flicker detection images are focused on in this embodiment, the photometric values AE(1) to AE(12) are obtained. Further, regarding the acquisition time of each photometric value, since the accumulation is performed in a finite time, it is represented by the median value during the accumulation period, and are described as t (1) to t (12), respectively.

When the process is started in step S201, in step S202, the photometric values AE(1) to AE(12) are calculated for 12 of the 18 flicker detection images acquired in step S102, and the photometric values AE(1) to AE(12) are calculated, and 100 Hz flicker determination calculation is performed in step S204. In the present embodiment, the evaluation value used for the flicker frequency determination is defined by the following equation (1).

$$SAD(m) = \Sigma_{i=1}^{6} |AE(n) - AE(n+m)| \quad (1)$$

In the equation (1), SAD is an abbreviation for "Sum of Absolute Difference", and is an index showing the degree of similarity used in the field of pattern matching and the like. m is a numerical value indicating the count of the photometric value to be used for calculating the degree of similarity with the photometric value AE(n) which is the $n^{th}$ calculation value for 12 images from the $n^{th}$. Therefore, SAD(m) is an equation for calculating the degree of similarity with the photometric value calculated after the elapse of (1.66×m) ms. As can be seen from the equation (1), the higher the similarity, the smaller the value of SAD(m).

For example, in a 100 Hz flicker environment, the flicker cycle is about 10 ms. Therefore, since the relationship between the flicker cycle and the accumulation period 1.66 ms for the flicker detection image is 10÷1.66≈6, as shown in FIG. 7A, the similar photometric value is obtained every 6 cycles regardless of the accumulation timing. That is, the relationship is AE(n)≈AE(n+6). Due to this property, when SAD(6) is calculated in the 100 Hz flicker environment, SAD(6)≈0. Therefore, an appropriate predetermined threshold value SAD_100 is set, and if at least $$SAD(6) \leq SAD\_100$$

is satisfied, it is possible to simply detect that 100 Hz flicker may occur. Here, since the brightness is constant in an environment where flicker does not occur, AE(1)≈AE(2)≈ . . . ≈AE(12), and SAD(6)=0. Therefore, SAD(3) is also calculated in order to detect the occurrence of flicker. SAD(3) is a value indicating the degree of similarity with a photometric value and another photometric value after 1.66× 3≈5 ms has elapsed. In a 100 Hz flicker environment, the photometric values obtained at timings with 5 ms difference are of a completely opposite phase relationship of the flicker cycle, so that SAD(3) is a very large value as compared with SAD(6).

In consideration of the above, FIG. 8A shows a graph showing the boundary between the occurrence and absence of flicker, with SAD(3) obtained from 12 photometric values calculated from 12 flicker detection images on the horizontal axis and SAD(6) obtained from 12 photometric values calculated from 12 flicker detection images on the vertical axis. In the present embodiment, if SAD(3) and SAD(6) fall within the region below the graph, it is determined that 100 Hz flicker occurs.

After completing the 100 Hz flicker determination calculation in step S204, 120 Hz flicker determination calculation is then performed in step S206.

In a 120 Hz flicker environment, the flicker cycle is about 8.333 ms, so that AE(n)≈AE(n+5) and SAD(5)≈0 as shown in FIG. 7B. Further, in the flicker of 120 Hz, the completely opposite phase relationship occurs after 4.16 ms, and it is ideal to calculate the similarity between a waveform and a waveform after 4.16 ms. However, since 4.16 ms is not an integer multiple of the accumulation period of the flicker detection image of 1.66 ms, the value of SAD(3) indicating the similarity with the waveform after 5 ms has elapsed is substituted as a value relatively close to the ideal value. Even in the 120 Hz flicker environment, SAD(3) shows the similarity of photometric values that change at intervals close to the opposite phase, so that SAD(3) has a very large value as compared with SAD(5).

From the above, with the same concept as step S204, with respect to flicker that occurs when the commercial power supply is 60 Hz (flicker lighting frequency is 120 Hz), FIG. 8B shows a graph showing the boundary between the occurrence and absence of flicker, with SAD(3) obtained from 12 photometric values calculated from 12 flicker detection images on the horizontal axis and SAD(5) obtained from 12 photometric values calculated from 12 flicker detection images on the vertical axis. In the present embodiment, if SAD(3) and SAD(5) fall within the region below the graph, it is determined that 120 Hz flicker occurs.

The area dividing lines shown in FIGS. 8A and 8B are merely examples, and their inclinations and bending points are not limited to them.

After the determination of the 100 Hz flicker and the determination of the 120 Hz flicker are completed, a final integration process of determination results is performed in step S207. In the integration process, the determination is made according to a table shown in FIG. 9, and this table will be explained below.

In an environment where flicker does not occur, since the brightness is constant, AE(1)≈AE(2)≈ . . . ≈AE(12), so SAD(3)≈SAD(5)≈SAD(6)=0. Therefore, in both FIGS. 8A and 8B, the values exist near the origin, and it is determined that "not 100 Hz" and "not 120 Hz", and as a result, no flicker is determined as shown in FIG. 9.

Next, in the 100 Hz flicker environment, SAD(3) and SAD(5) have large values, and SAD(6)≈0, so that "100 Hz" and "not 120 Hz" are determined. As a result, 100 Hz flicker is determined as shown in FIG. 9.

In the 120 Hz flicker environment, SAD(3) and SAD(6) have large values, and SAD(5)≈0, so that "not 100 Hz" and "120 Hz" are determined. As a result, 120 Hz flicker is determined as shown in FIG. 9.

Finally, when "100 Hz" and "120 Hz" are determined, although it does not usually occur, there is a possibility that, when the subject changes during accumulation of the 12 images that are the basis of the calculation, factors other than the change in brightness due to flicker have affected. This case corresponds to a detection error, and in this processing, as shown in FIG. 9, it is determined that flicker does not occur and any special control for flicker countermeasures will not be performed.

As a result of the flicker determination in step S207, if it is determined that flicker occurs, the process proceeds to step S208, and if it is determined that no flicker occurs, the process proceeds to step S209.

Figure 10:
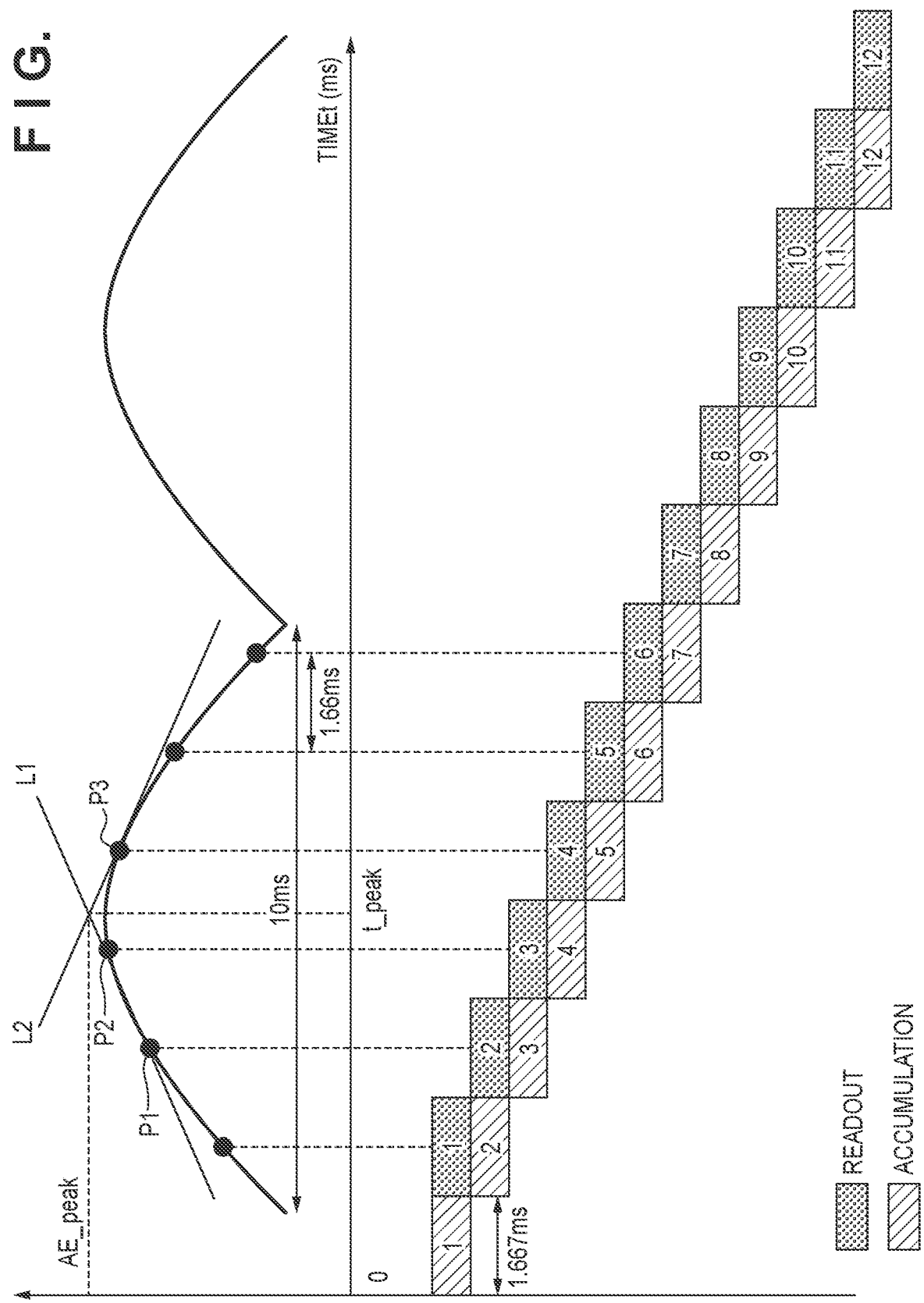
FIG. 10 is a diagram illustrating a method of calculating a peak timing of flicker according to the first embodiment.

In step S208, a peak timing of the flicker is calculated. FIG. 10 is a diagram illustrating an example of a method of calculating the peak timing of flicker.

Let the point where the maximum value is obtained among AE(1) to AE(12) be P2 (t(m), AE(m)), and the point of the photometric result immediately before that be P1 (t(m−1), AE(m−1)), and the point of the photometric result after immediately after that be P3 (t(m+1), AE(m+1)). First, a straight line passing through the two points, one is the point that takes the smaller of AE(m−1) and AE(m+1) (P1 in the example of FIG. 10) and the other is the point P2, is obtained as L1=at +b. Further, the tangent line of the point that takes the larger of AE(m−1) and AE(m+1) (P3 in the example of FIG. 10) is obtained as L2. The intersection of the straight lines L1 and L2 obtained in this way is calculated as the flicker peak timing t_peak and the photometric value AE_peak at the peak.

Since the peak timing exists in each cycle of the detected flicker, the shutter is controlled to travel in synchronization with this peak timing in step S110 based on the peak timing t_peak calculated in step S208.

Further, in step S209, a warning message is displayed so that the user notices the occurrence of flicker in the shooting environment. The warning message is displayed by superimposing a character string such as "FLICKER!" on the rear monitor 106 or the finder display unit 107 that is displaying the live view image. Since the flicker detection processes in steps S104 to S106 are repeatedly performed during the live view display, for example, when the camera is used outdoors where no flicker occurs and then the camera is moved indoors where flicker occurs, a warning message is displayed when the camera is moved indoors. When moving from indoors to outdoors, the warning message disappears when the camera is moved outdoors.

Figure 4:
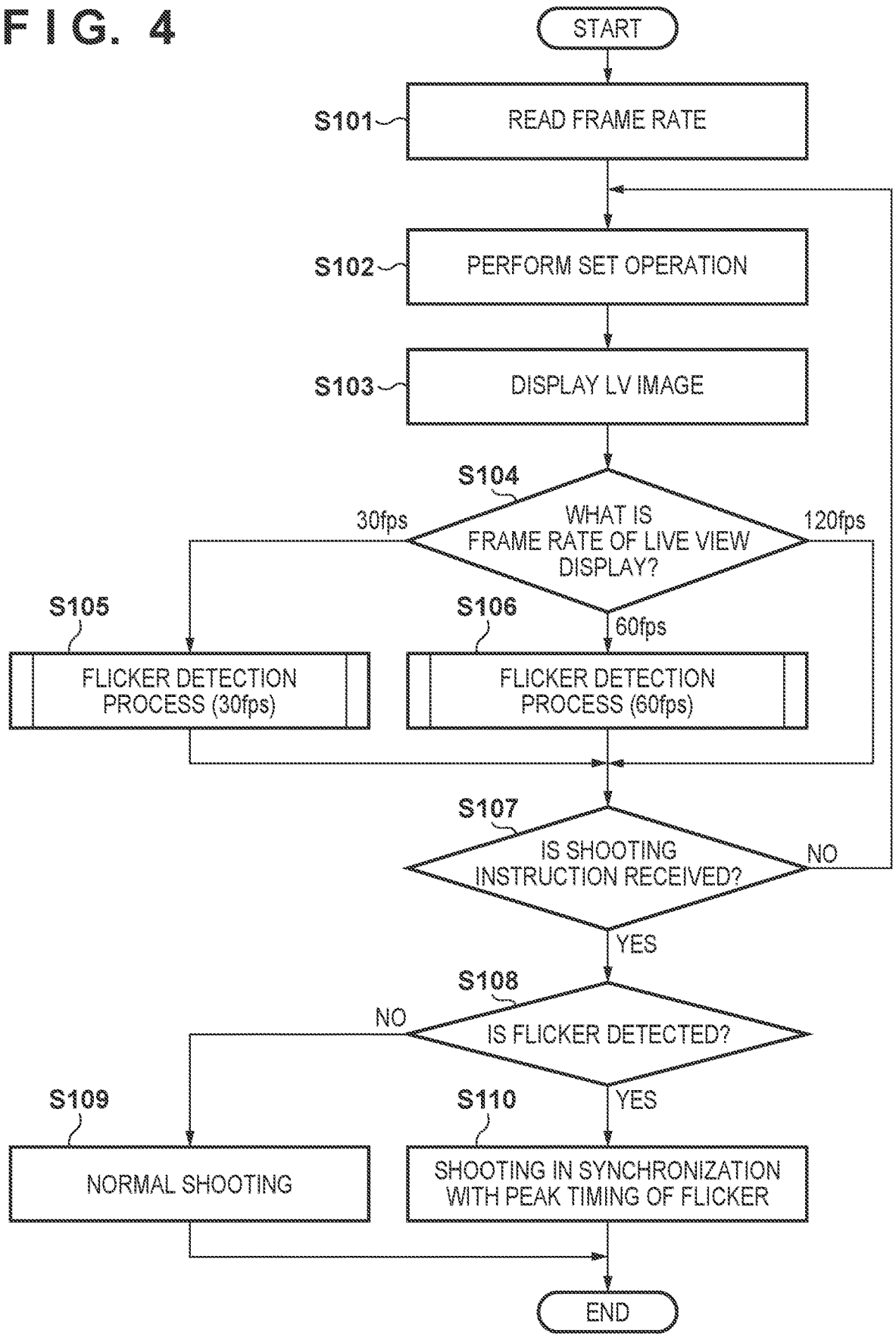
FIG. 4 is a flowchart of shooting processing in the live view mode according to the first embodiment.

After the flicker detection is performed and the detection result is reflected as the warning message, the flicker detection processing when the frame rate of the live view display is set to 30 fps is ended, and the process proceeds to step S107 in FIG. 4.

Figure 6:
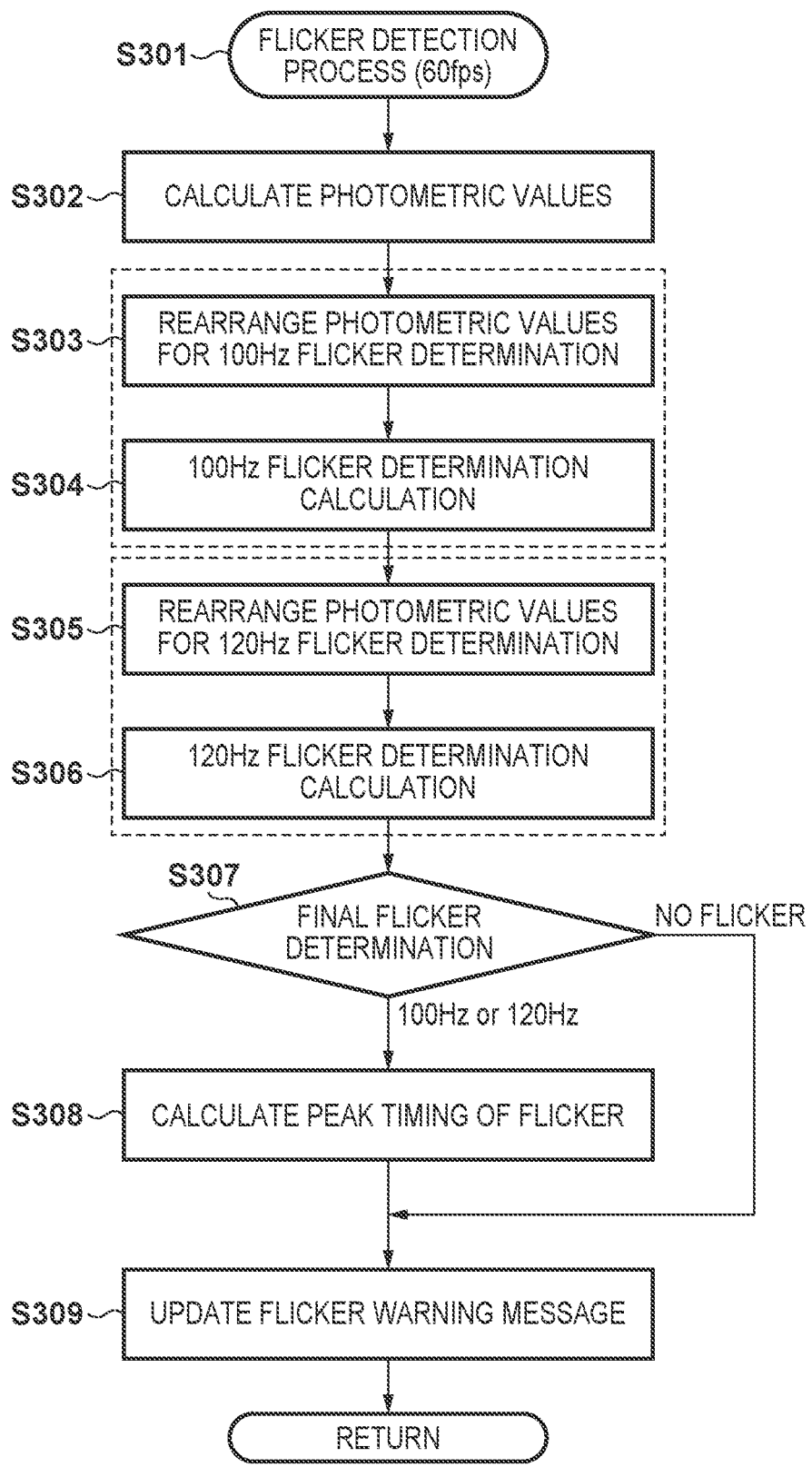
FIG. 6 is a flowchart of a flicker detection process when the frame rate of the live view display is 60 fps according to the first embodiment.

Next, the flicker detection process performed in step S106 of FIG. 4 when the frame rate of live view display is set to 60 fps will be described with reference to the flowchart of FIG. 6.

When the process is started in step S301, in step S302, the photometric values are calculated from the flicker detection images acquired in step S102. When the frame rate of live view display is 60 fps, the remaining time after acquiring the LV image is shorter than twice the cycle of the flicker to be detected, and the number of flicker detection images that can be acquired in each set operation is eight as shown in the FIG. 3. However, the same flicker detection process as at 30 fps described above cannot be performed with only eight flicker detection images. Therefore, in steps S303 to S306, processing is performed when the frame rate of live view display is 60 fps.

FIGS. 11A and 11B are diagrams showing the relationship between the acquisition timings of the flicker detection images and the photometric values obtained from the flicker detection images when the frame rate of live view display is 60 fps and flicker occurs. In FIGS. 11A and 11B, a photometric value obtained from the $n^{th}$ flicker detection image is referred to as AE(n) as in FIGS. 7A and 7B.

FIG. 11A is a diagram showing an example in the case where 100 Hz flicker occurs. In FIG. 11A, black circles indicate the shooting timings and photometric value of the acquired flicker detection images, and white circles indicate the shooting timings at which the flicker detection image could not be shot and predicted values of the photometric values. When the frame rate of live view display is 60 fps, after taking the LV image, eight flicker detection images are continuously acquired, and this acquisition is regarded as one set, and the set is repeated every 16.66 ms (=1/60 fps).

In this case, as shown in FIG. 11A, in spite that the continuous information of AE(1) to AE(12) are desired for flicker detection, information in the period, including the timings for acquiring the information of AE(9) and AE(10), enclosed by the broken line cannot be obtained. Therefore, the same 100 Hz flicker determination calculation as in step S204 at 30 fps described above cannot be performed.

Here, if 100 Hz flicker occurs, AE(n)=AE(n+6) holds, so AE(15) and AE(16) included in the next set can be used instead of AE(9) and AE(10). That is, the order of 16 photometric values of AE(1) to AE(8) and AE(11) to AE(18) acquired in two consecutive sets is changed to $$AE(1)\text{-}AE(8) \rightarrow AE(15) \rightarrow AE(16) \rightarrow AE(11) \rightarrow AE(12)$$

By doing so, it becomes possible to perform the 100 Hz flicker determination calculation similarly to that performed in step S204. In step S303, the photometric values obtained from the 16 flicker detection images acquired in the two consecutive set operations (during a plurality of cycles of live view display) are rearranged, and in step S304, the rearranged photometric values are used for 100 Hz flicker determination using the same determination operation as in step S204.

Here, the two consecutive set operations are the current set operation and the immediately previous set operation, and photometric values obtained from the flicker detection images obtained in the current set operation and the flicker detection images obtained in the immediately previous set operation are used. Therefore, the photometric values corresponding to the current set operation are AE(11) to AE(18), and the photometric values corresponding to the immediately previous set operation are AE(1) to AE(8).

In the above-mentioned example, the photometric values AE(1) to AE(8) obtained in the immediately previous set operation are all used for sorting, but the present invention is not limited to this. For example, using 16 photometric values AE(1) to AE(8) and AE(11) to AE(18) obtained in the two set operations, the missing AE(9) and AE(10) are interpolated while maintaining the relationship of AE(n) =AE(n+6), and rearranging the photometric values using the interpolated missing AE(9) and AE(10). As an example, it is conceivable to rearrange the photometric values in the order of $$AE(7) \rightarrow AE(8) \rightarrow AE(3) \rightarrow AE(4) \rightarrow AE(11) \text{ to } AE(18).$$

Further, in step S304, due to the relationship of AE(n)=AE(n+6), AE(15) and AE(16) obtained in the current set operation are used instead of AE(9) and AE(10) which are missing in the immediately previous set operation. However, in a 100 Hz flicker environment, ideally, when k is an arbitrary integer, a relationship of AE(n)=AE(n+6k) holds. Therefore, AE(9) and AE(10) may be photometric values missing in the two or more previous set operation, in which case, the photometric values obtained in the current set operation used instead are AE(21) and AE(22), AE(27) and AE(28), and so forth.

However, in reality, the frequency of the commercial power supply supplied from the electric power company is not exactly 50 Hz or 60 Hz, but fluctuates within a certain range, for example, 50±0.2 Hz. Therefore, paying attention only during a certain period, the flicker frequency also fluctuates from 100 Hz and 120 Hz. If the flicker frequency is not exactly 100 Hz, AE(n)=AE(n+6k) does not hold, and the larger the value of k is, the larger the difference between AE(n) and AE(n+6k) becomes. Therefore, it is desirable to use the photometric values obtained at the timings as close as possible to the timings at which the photometric values are obtained in the current set operation.

The same calculation is performed when 120 Hz flicker is to be detected, and an example in the case where 120 Hz flicker occurs is shown in FIG. 11B. Although AE(9) and AE(10) cannot be obtained in FIG. 11B, AE(14) and AE(15) can be used instead due to the relationship AE(n)=AE(n+5). That is, 16 photometric values of AE(1) to AE(8) and AE(11) to AE(18) acquired in two consecutive set operations are rearranged in the order of $$AE(1)\text{-}AE(8) \rightarrow AE(14) \rightarrow AE(15) \rightarrow AE(11) \rightarrow AE(12)$$

it is possible to perform the same 120 Hz flicker determination operation as in step S206. In this way, in step S305, the photometric values obtained from the 16 flicker detection images acquired in the two consecutive set operations are rearranged, and in step S306, the rearranged photometric values are subjected to the same determination calculation as in step S206, and the 120 Hz flicker determination is performed.

In the above-mentioned example, the photometric values AE(1) to AE(8) obtained in the immediately previous set operation are all used for sorting, but the present invention is not limited to this. For example, 16 photometric information of AE(1) to AE(8) and AE(11) to AE(18) obtained in the two set operations may be rearranged while interpolating the missing AE(9) and AE(10) with keeping the relationship of AE(n)=AE(n+5). As an example, the order of $$AE(7) \rightarrow AE(8) \rightarrow AE(4) \rightarrow AE(5) \rightarrow AE(11) \text{ to } AE(18)$$

may be conceivable.

Further, as described in the 100 Hz flicker determination in step S304, in a 120 Hz flicker environment, when k is an arbitrary integer, a relationship of AE(n)=AE(n+5 k) ideally holds. Therefore, AE(9) and AE(10) may be photometric values missing in the two or more previous set operation, and in which case, the photometric values obtained in the current set operation used instead are AE(24) and AE(25) and so forth. However, considering the fluctuation of the frequency of the commercial power supply, it is desirable to use the photometric values obtained at the timings as close as possible to the timings at which the photometric values are obtained in the current set operation.

The processes of steps S307 to S309 are the same as the processes of steps S207 to S209, and the description thereof will be omitted.

Finally, the reason why the process proceeds to step S107 as flicker being not detected without performing the flicker detection process when it is detected in step S104 that the frame rate of the live view display is set to 120 fps will be described.

Figure 12:
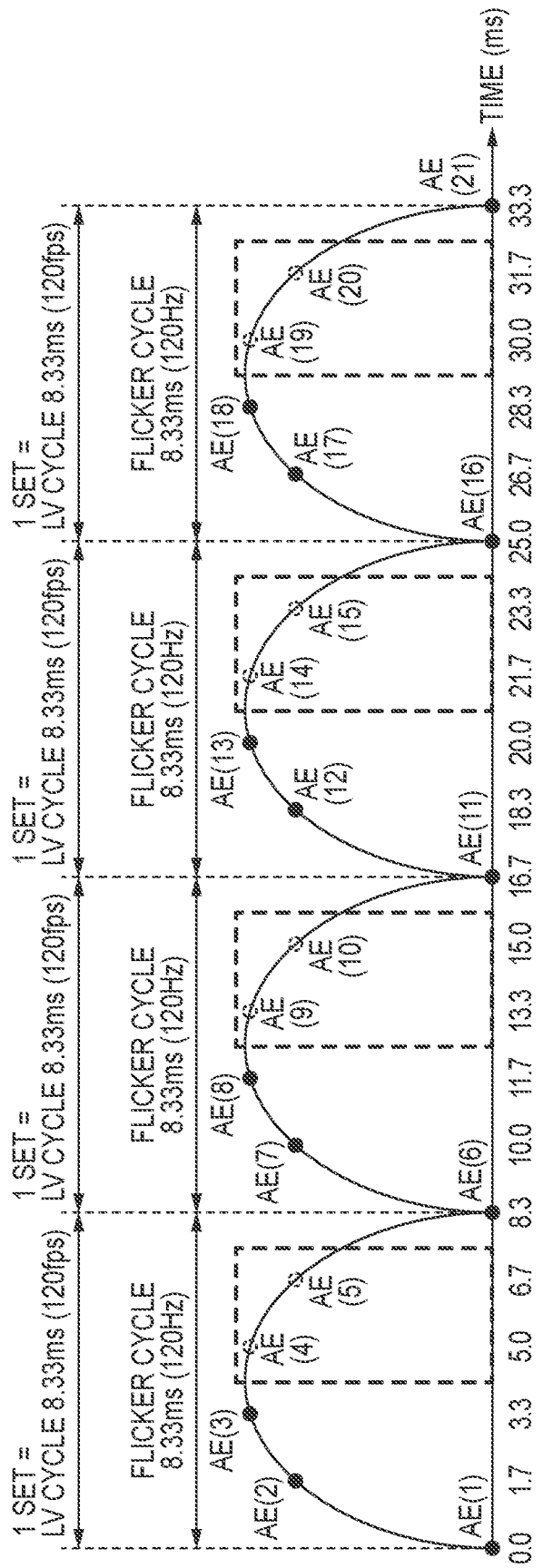
FIG. 12 is a diagram showing the relationship between acquisition timings of images for flicker detection and the outputs of photometric values when the frame rate of the live view display is 120 fps according to the first embodiment.

FIG. 12 is a diagram showing the relationship between the shooting timings of the flicker detection images and the photometric values obtained from the flicker detection images when the frame rate of the live view display is set to 120 fps and the flicker of 120 Hz occurs.

When the frame rate of the live view display is 120 fps, as shown in FIG. 3, one LV image and three consecutive flicker detection images are acquired, and this acquisition is regarded as one set, and the set is repeated every 8.33 ms which is the live view display cycle. If there are four photometric values of AE(4), AE(5), AE(9), and AE(10) as shown in FIG. 11B, 120 Hz flicker is detected using the same method as used in step S206. However, these four pieces of information cannot be obtained. Further, since the cycle of the set operation and the frequency of the flicker match at 120 Hz, the missing information of AE(4), AE(5), AE(9) and AE(10) cannot be interpolated from the flicker detection images acquired in the subsequent set operation. Therefore, when the frame rate of the live view display is set to 120 fps, 120 Hz flicker cannot be detected. Therefore, it is determined in step S104 that the flicker detection process is not performed, and the subsequent processes are performed without detecting flicker.

If the frame rate can be set to an arbitrary value and the frame rate of the live view display is set to 100 fps, since 100 Hz flicker cannot be detected, the subsequent processes are performed without detecting the 100 Hz flicker. That is, if the frame rate of the live view display and the cycle of flicker to be detected are the same, the flicker is not detected.

It should noted that, in FIG. 4, a processing flow in which, in a case where the frame rate of the live view display is 120 fps, the flicker detection is not performed as a non-flicker detection process. However, the present invention is not limited to this, and at 120 fps, flicker detection may be performed by using another flicker detection method without performing the operation as shown in FIG. 2. For example, instead of repeatedly performing the operation of acquiring one LV image and the flicker detection images as a set operation as shown in FIG. 2, the following operation may be performed. That is, only the LV images are continuously acquired at 120 fps, the live view display is stopped once every predetermined seconds, 12 flicker detection images are acquired at 600 fps during this stop period, then the live view display is restored. In this case, the live view display freezes every predetermined seconds, which may affect the framing by the user, but flicker can be detected from the images acquired while the live view display is stopped.

As described above, according to the present embodiment, flicker can always be detected without the live view display being blacked out or frozen even during the live view display is performed.

In the above description, the case where the flicker detection images are read out after reading out the LV image has been described, but the present invention is not limited to this, and the flicker detection images may be read out first and the LV image may be read out at last. Alternatively, the LV image may be read out while reading out a plurality of flicker detection images.

Further, in the above description, a configuration in which one LV image is read out in one set operation is mentioned. However, for example, if there is some time left in each period for one set operation, (such as in a case where the number of pixels to be read out is low), a plurality of LV images may be read out in one set operation.

Further, in the above description, the set operation for detecting flicker is performed for each frame as far as possible according to the display cycle of the LV images, but the present invention is not limited to this. For example, in order to reduce the power consumption, the set operation may be performed once every plural frames.

Second Embodiment

Next, the second embodiment of the present invention will be described. In the second embodiment, a method of detecting flicker when the frame rate of the live view display is 120 fps will be described.

Since the configuration of an image capturing apparatus and the basic flicker detection algorithm in the second embodiment are the same as those in the first embodiment described above with reference to FIGS. 1 to 3, the description thereof will be omitted. Hereinafter, the processing specific to the second embodiment will be described with reference to FIGS. 13 to 16B.

Figure 13:
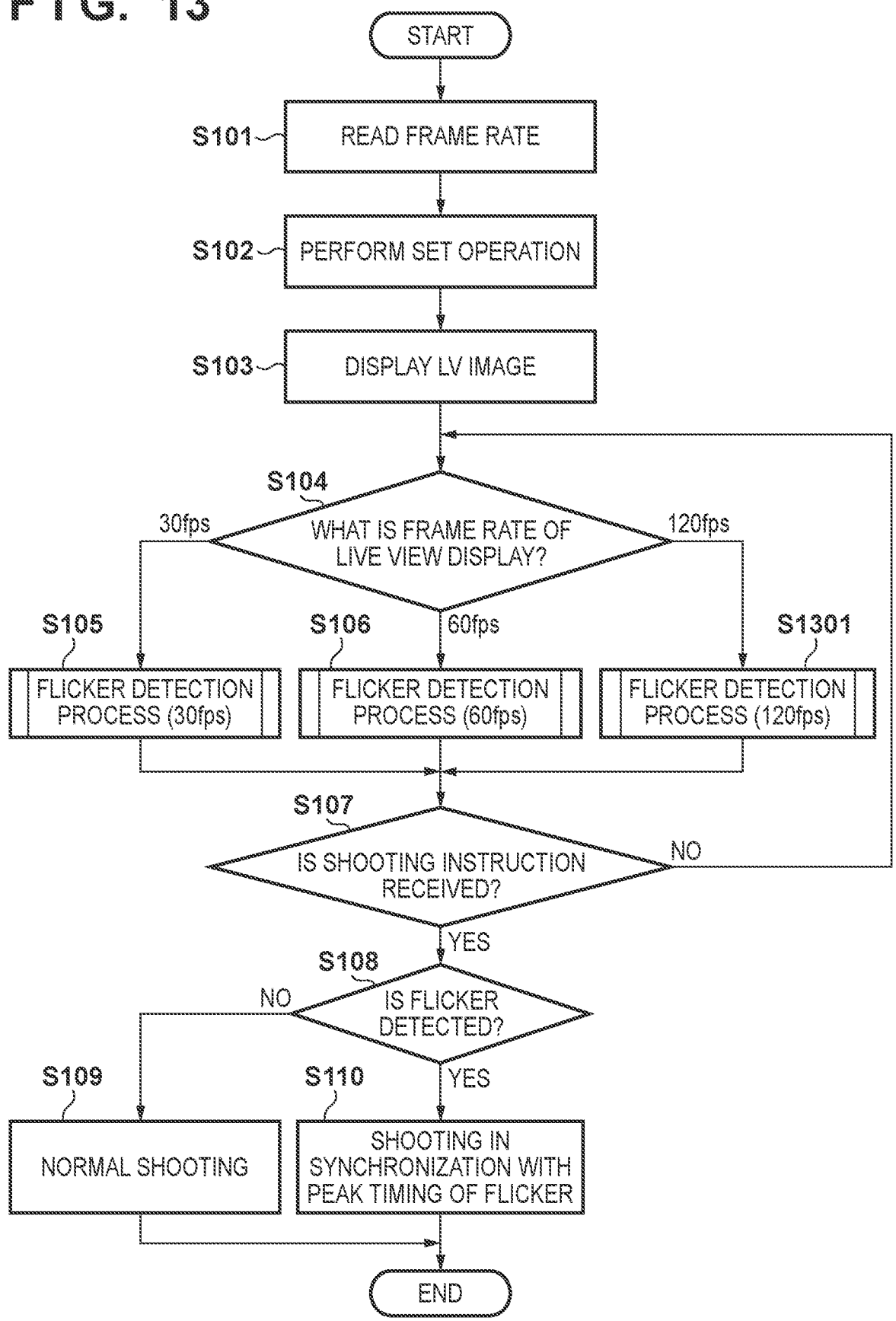
FIG. 13 is a flowchart of shooting processing in the live view mode according to a second embodiment.
Figure 14:
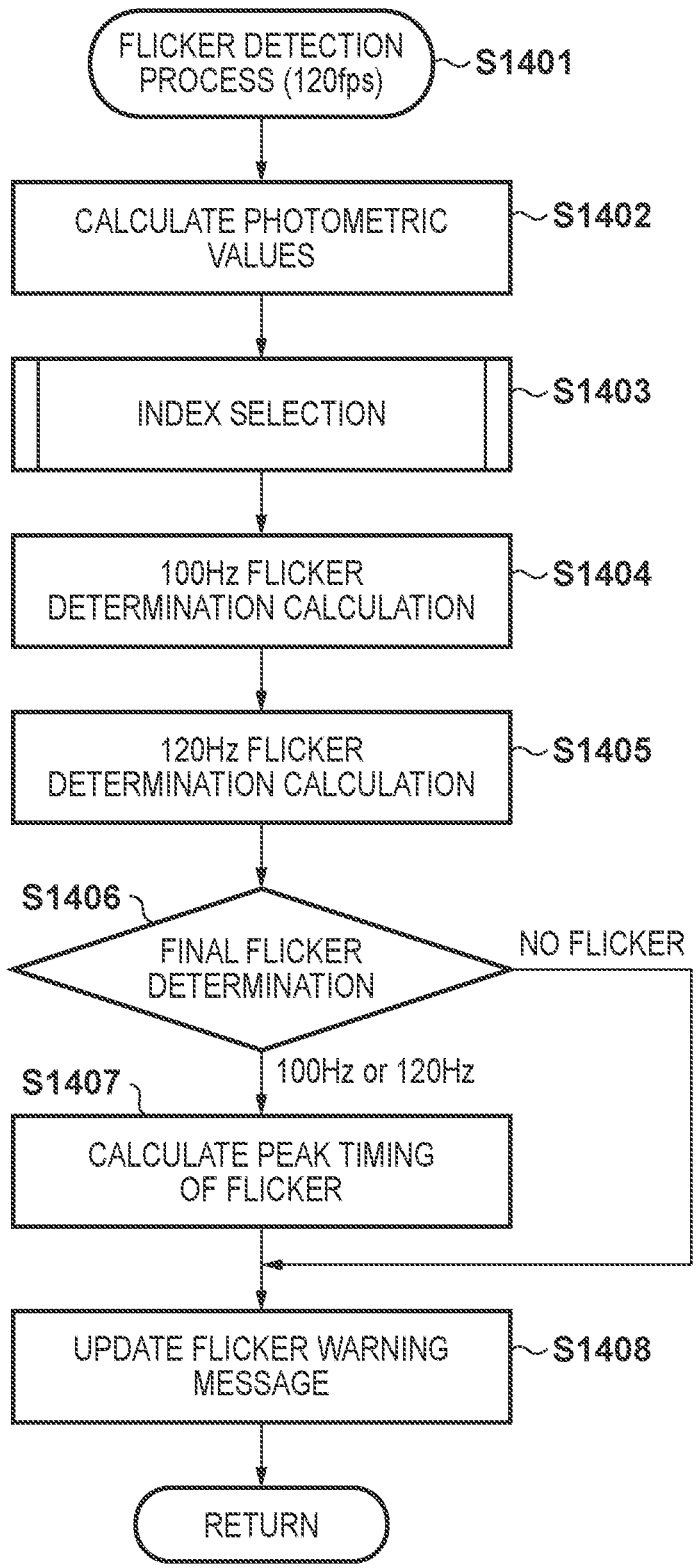
FIG. 14 is a flowchart of a flicker detection processing when the frame rate of the live view display is 120 fps according to the second embodiment.

FIG. 13 is a flowchart showing shooting processing in the live view mode according to the second embodiment. Different from the processing shown in FIG. 4 described in the first embodiment, even when the set frame rate of the live view display is 120 fps, the flicker detection process is performed in step S1301. In the first embodiment, the missing photometric values cannot be substituted by the photometric values obtained in the immediately previous set operation, so that the flicker is not detected. On the other hand, in the second embodiment, even if some of the photometric values used for flicker detection are missing, the flicker detection process is performed using a similar algorithm using only the photometric values that can be acquired. In the process of FIG. 13, the same processes as those of FIG. 4 are assigned the same step numbers, and the description thereof will be omitted.

When the frame rate of the live view display is set to 120 fps, the flicker detection process in a case where the frame rate of the live view display is 120 fps is executed in step S1301. This process will be described with reference to the flowchart of FIG. 14.

When the process is started in step S1401, photometric values AE(1) to AE(12) are calculated in step S1402 using the flicker detection images acquired in step S102. Here, when the frame rate of the live view display is 120 fps, as shown in FIG. 12, the information of AE(4), AE(5), AE(9), and AE(10) is missing. The formula for defining the evaluation value used for the flicker frequency determination described in the first embodiment was a formula using the value obtained by summing the differences of the photometric values as an index. On the other hand, in the second embodiment, since the combination of images that can be used for calculating the difference between the photometric values differs depending on the SAD value, the formula is defined by the following equation.

$$SAD(m) = \frac{1}{p}\sum_{i=1}^{6}|AE(n) - AE(n+m)|$$

Further, the number of pairs p of the photometric values and the point n ($n^{th}$ time) of each photometric value that can be used in the SAD calculation at that time are as follows.

SAD(6): $p=2, n=1,2$

SAD(5): $p=3, n=1,2,3$

SAD(3): $p=1, n=3$

Specifically, in SAD(5), three pairs of photometric values of AE(1) and AE(6), AE(2) and AE(7), AE(3) and AE(8) can be used, and in SAD(6), two pairs of photometric values of AE(1) and AE(7), AE(2) and AE(8) can be used. On the other hand, in SAD(3), only one pair of photometric values of AE(3) and AE(6) can be used. As described in the first embodiment, in SAD(3), when a flicker of 100 Hz or 120 Hz, which is a frequency to be detected, occurs, phases of the accumulation timings of flicker detection images become opposite of the flicker cycle. Accordingly, it is assumed that the value of SAD(3) will be very large comparing to SAD(5) and SAD(6). However, since only one pair of photometric values can be used to calculate SAD(3), as shown in FIG. 16A, there may be a timing when the photometric values of the images are the same even if the accumulation timings are opposite in phase. At this time, the value of SAD(3) becomes 0. That is, even in an environment where flicker occurs, flicker may not be detected depending on the accumulation timings of flicker detection images.

On the other hand, when SAD(4) is calculated as the evaluation value, in the above-described formula that defines the evaluation value used for the flicker frequency determination, the number of pairs p of photometric values and the point n ($n^{th}$ time) of each photometric value that can be used for the SAD calculation is SAD(4): $p=2, n=2,3$ That is, in SAD(4), two pairs of photometric values AE(2) and AE(6), AE(3) and AE(7) can be used. Since SAD(4) corresponds to accumulations whose interval is 1.667× 4=6.67 ms, the phase is not completely opposite with respect to either 100 Hz flicker or 120 Hz flicker. However, as shown in FIG. 16B, there is a difference between the photometric values for SAD(4) in an environment where flicker occurs. Therefore, the minimum value of SAD(4) calculated from the two pairs of photometric values is at least larger than that of SAD(3), which may have a value of 0.

Figure 15:
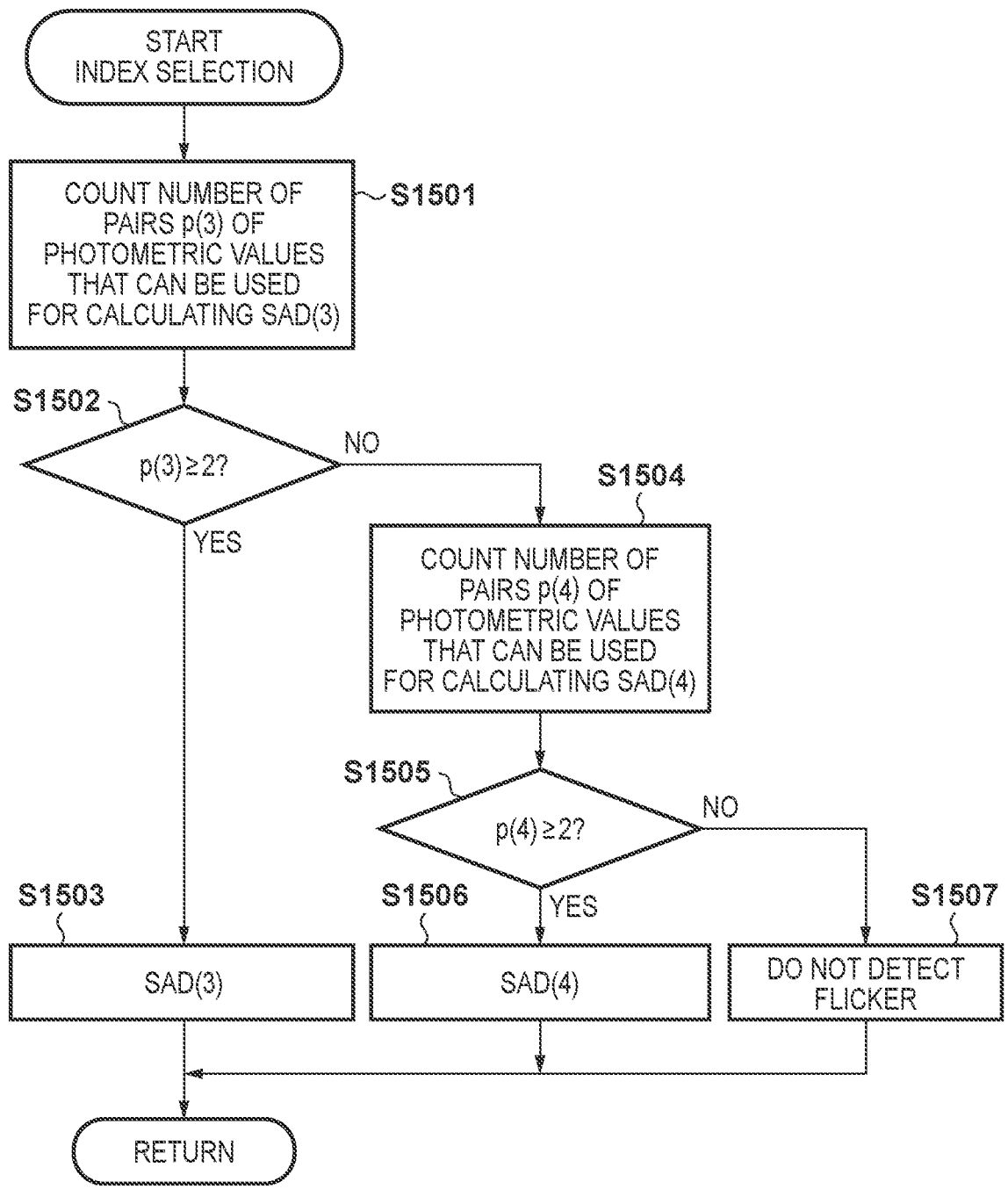
FIG. 15 is a flowchart of an index selection process according to the second embodiment.

The method for determining the evaluation value described above will be explained with reference to the flowchart of FIG. 15. The flow of selecting an index suitable for the SAD value used for the horizontal axis of the graph showing the boundary of the occurrence or absence of flicker in FIG. 8 is started, and in step S1501, the number of pairs p(3) of photometric values that can be used for calculating SAD(3) which can take the largest value in the opposite phase. In step S1501, in a case where a total of 12 photometric values (that is, image signals) are continuously acquired at 600 fps in consideration of a period twice as long as one cycle (that is, two cycles) of change in amount of light with respect to 100 Hz and 120 Hz flickers, the number of pairs of photometric values out of the 12 photometric values is used for determination. In step S1502, it is determined whether or not the number of pairs p(3) of the photometric values is 2 or more, and if it is 2 or more, the process proceeds to step S1503 where it is determined to use SAD(3) on the horizontal axis of the graph showing the boundary between the occurrence or absence of flicker.

On the other hand, in a case where it is determined in step S1502 that the number of pairs p(3) is 1 or less, the process proceeds to step S1504 where the number of pairs p(4) of photometric values that can be used for calculating SAD(4) is counted. In step S1505, it is determined whether or not the number of pairs p(4) of photometric values is 2 or more, and if it is 2 or more, the process proceeds to step S1506 and SAD(4) is determined to be used on the horizontal axis of the graph showing the boundary between the occurrence or absence of flicker. If the number of pairs P(4) of photometric values is also 1 or less, the process proceeds to step S1507, and it is determined not to detect flicker.

The calculation of SAD is determined based on the number of pairs of photometric values, but it may be determined in advance in accordance with the frame rate or may be switched depending on the number of images that can be acquired in one set operation. Further, an algorithm that uses SAD(4) for flicker determination may be used regardless of the determination method. That is, when the frame rate of the live view display is 60 fps, the evaluation value of SAD(4) may be referred to for the flicker determination. In this case, the accuracy of flicker detection may be lower than when referring to the evaluation value of SAD (3), but since it is not necessary to rearrange the photometric values to be used for detection, the data amount in the memory can be reduced.

When the index is selected in step S1403, the process proceeds to step S1404. Since the processes in steps S1404 to S1408 are the same as the processes in steps S204 to S209 of FIG. 5, the description thereof will be omitted. However, in the second embodiment, in the determination process in steps S1404 and S1405, SAD(4) is used on the horizontal axis of the graph showing the boundary between the occurrence or absence of flicker shown in FIG. 8.

As described above, according to the present embodiment, it is possible to detect flicker even when the live view display cycle is 120 fps.

In the present embodiment, the case where the display cycle (frame rate) of the live view display is 120 fps has been described, but the present invention is not limited to this. For example, when the cycle of the live view display is 240 fps, the same problem as in the case of 120 fps occurs, so that flicker may be detected by using SAD(4). Further, when the frequency of the flicker to be detected is 100 Hz and the period (frame rate) of the live view display is 100 fps, the flicker can be detected by the same method. That is, even when the integral multiple of the frequency of the flicker to be detected and the display cycle of the live view display match, flicker can be detected by using SAD(4) which is obtained by changing the pairs of photometric values (image signals) used for calculating evaluation value SAD. As the live view display cycle becomes faster (shorter), the number of photometric values for flicker detection obtained in one set operation also decreases. So it should be noted that it is necessary to adjust the time required to read out the live view image.

Other Embodiments

The present invention may be applied to a system composed of a plurality of devices or a device composed of one device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-094908, filed on May 29, 2020, and No. 2021-024400, filed on Feb. 18, 2021 which are hereby incorporated by reference herein in their entirety.

What is claimed is:

1. An image capturing apparatus comprising:
an image sensor;
a drive control unit that controls driving of the image sensor; and
a detection unit that calculates an evaluation value based on a plurality of second images and detects flicker based on the evaluation value,
wherein the drive control unit controls the driving of the image sensor so as to perform, during a first cycle of a display device:
a first operation for reading out a first image to be displayed on the display device; and
a second operation for reading out the plurality of second images at a second cycle which is shorter than the time taken to read out the first image at timings different from a timing of reading out the first image in a predetermined period in which the first image is read out from the image sensor, and
wherein, upon calculating the evaluation value based on the plurality of second images, the detection unit detects the flicker by using different pairs of images from among the plurality of second images for calculation of the evaluation value according to the first cycle,
wherein each unit is implemented by one or more processors, circuitry or a combination thereof.

2. The image capturing apparatus according to claim 1, wherein, in a case where a remaining period of the predetermined period after reading out the first image is two or more times as long as a cycle of change in amount of light of the flicker to be detected, the detection unit detects the flicker using pairs of images from among the plurality of second images obtained during the predetermined period.

3. The image capturing apparatus according to claim 1, wherein, in a case where a remaining period of the predetermined period after reading out the first image is shorter than twice a cycle of change in amount of light of the flicker to be detected, and the first period is not equal to the cycle of change in the amount of light of the flicker to be detected, the detection unit detects the flicker using pairs of images from among the plurality of second images obtained during a plurality of predetermined periods.

4. The image capturing apparatus according to claim 3, wherein, in a case where the detection unit detects the flicker using the pairs of images from among the plurality of second images obtained during the plurality of predetermined periods, the detection unit interpolates a second image, which was not obtained during read out of the first image, with the second image obtained at different timing corresponding to a frequency of the flicker to be detected.

5. The image capturing apparatus according to claim 1, wherein, in a case where the first cycle is substantially equal to a cycle of change in amount of light of the flicker to be detected, the detection unit does not detect the flicker.

6. The image capturing apparatus according to claim 1, wherein the detection unit calculates the evaluation value by comparing a pair of images from among plurality of second images obtained at a predetermined interval among the plurality of the second images obtained during a period twice as long as a cycle of change in amount of light of the flicker to be detected.

7. The image capturing apparatus according to claim 6, wherein, in a case where the first cycle is substantially equal to an integer multiple of the cycle of change in the amount of light of the flicker to be detected, and the first cycle is a first frame rate, the detection unit calculates the evaluation value by comparing a pair of images from among the plurality of second images obtained at a first interval, and in a case where the first cycle is a second frame rate which is shorter than the first frame rate, the detection unit calculates the evaluation value by comparing a pair of images from among the plurality of second images obtained at a second interval which is different from the first interval.

8. The image capturing apparatus according to claim 7, wherein the first interval is an interval closer to an opposite phase of the flicker to be detected.

9. The image capturing apparatus according to claim 1, wherein, in a case where a number of pairs of the plurality of second images that can be obtained in a period is twice as long as the cycle of change in amount of light of the flicker to be detected, the detection unit does not detect the flicker.

10. A control method of an image capturing apparatus having an image sensor, the method comprising:
a drive control step of controlling driving of the image sensor; and
a detection step of calculating an evaluation value based on a plurality of second images and detecting flicker based on the evaluation value,
wherein, in the drive control step, the driving of the image sensor is controlled so as to perform, during a first cycle of a display device:
a first operation for reading out a first image to be displayed on the display device; and
a second operation for reading out the plurality of second images at a second cycle which is shorter than the time taken to read out the first image at timings different from a timing of reading out the first image in a predetermined period in which the first image is read out from the image sensor, and
wherein, in the detection step, upon calculating the evaluation value based on the plurality of second images, the flicker is detected by using different pairs of images from among the plurality of second images for calculation of the evaluation value according to the first cycle.

11. A non-transitory computer-readable storage medium storing a program that when executed by a computer causes the computer to perform the method of an image capturing apparatus having an image sensor, the method comprising:
a drive control step of controlling driving of the image sensor; and
a detection step of calculating an evaluation value based on a plurality of second images and detecting flicker based on the evaluation value,
wherein, in the drive control step, the driving of the image sensor is controlled so as to perform, during a first cycle of a display device:
a first operation for reading out a first image to be displayed on the display device; and
a second operation for reading out the plurality of second images at a second cycle which is shorter than the time taken to read out the first image at timings different from a timing of reading out the first image in a predetermined period in which the first image is read out from the image sensor, and
wherein, in the detection step, upon calculating the evaluation value based on the plurality of second images, the flicker is detected by using different pairs of images from among the plurality of second images for calculation of the evaluation value according to the first cycle.

12. The control method according to claim 10, wherein, in a case where a remaining period of the predetermined period after reading out the first image is two or more times as long as a cycle of change in amount of light of the flicker to be detected, the detection step detects the flicker using pairs of images from among the plurality of second images obtained during the predetermined period.

13. The control method according to claim 10, wherein, in a case where a remaining period of the predetermined period after reading out the first image is shorter than twice a cycle of change in amount of light of the flicker to be detected, and the first period is not equal to the cycle of change in the amount of light of the flicker to be detected, the detection step detects the flicker using the plurality of second images obtained during a plurality of predetermined periods.

14. The control method according to claim 10, wherein, in a case where the first cycle is substantially equal to a cycle of change in amount of light of the flicker to be detected, the detection step does not detect the flicker.

15. The control method according to claim 10, wherein the detection step calculates the evaluation value by comparing a pair of images from among the plurality of second images obtained at a predetermined interval among the plurality of the second images obtained during a period twice as long as a cycle of change in amount of light of the flicker to be detected.

16. The non-transitory computer-readable storage medium according to claim 11, wherein, in a case where a remaining period of the predetermined period after reading out the first image is two or more times as long as a cycle of change in amount of light of the flicker to be detected, the detection step detects the flicker using pairs of images from among the plurality of second images obtained during the predetermined period.

17. The non-transitory computer-readable storage medium according to claim 11, wherein, in a case where a remaining period of the predetermined period after reading out the first image is shorter than twice a cycle of change in amount of light of the flicker to be detected, and the first period is not equal to the cycle of change in the amount of light of the flicker to be detected, the detection step detects the flicker using pairs of images from among the plurality of second images obtained during a plurality of predetermined periods.

18. The non-transitory computer-readable storage medium according to claim 11, wherein, in a case where the first cycle is substantially equal to a cycle of change in amount of light of the flicker to be detected, the detection step does not detect the flicker.

19. The non-transitory computer-readable storage medium according to claim 11, wherein the detection step calculates the evaluation value by comparing a pair of images from among the plurality of second images obtained at a predetermined interval among the plurality of the second images obtained during a period twice as long as a cycle of change in amount of light of the flicker to be detected.

20. The image capturing apparatus according to claim 1, wherein the detection unit switches between (i) an operation of detecting the flicker using pairs of images from among the plurality of second images obtained during the predetermined period or (ii) an operation of detecting the flicker using pairs of images from among the plurality of second images obtained during a plurality of predetermined periods.

21. The control method according to claim 10, wherein the detection step switches between (i) an operation of detecting the flicker using pairs of images from among the plurality of second images obtained during the predetermined period or (ii) an operation of detecting the flicker using pairs of images from among the plurality of second images obtained during a plurality of predetermined periods.

22. The non-transitory computer-readable storage medium according to claim 11, wherein the detection step switches between (i) an operation of detecting the flicker using pairs of images from among the plurality of second images obtained during the predetermined period or (ii) an operation of detecting the flicker using pairs of images from among the plurality of second images obtained during a plurality of predetermined period.

* * * * *